3,336,343
MIXTURE OF 1,4,5-TRIAMINO-2,8- AND 3,8-DIHYDROXY ANTHRAQUINONE AND THE PREPARATION THEREOF
John E. Ferrari, Scarsdale, N.Y., assignor to Interchemical Corporation, New York, N.Y., a corporation of Ohio
No Drawing. Filed July 13, 1964, Ser. No. 382,335
3 Claims. (Cl. 260—380)

The present invention relates to triamino-dihydroxyanthraquinone dyes and to processes of making them.

This application is a continuation-in-part of Ser. No. 92,761 filed Mar. 2, 1961, now abandoned.

The dyestuffs of this invention are 1,4,5-triamino-2,8-dihydroxy-anthraquinone, 1,4,5-triamino-3,8-dihydroxyanthraquinone, their non-nuclear alkylated derivatives, and mixtures of these. The unalkylated dyes are made by reducing and hydroxylating 5-nitroanthraquinone-cyclic-1,4-disulfonimide by treatment with sulfur sesquioxide in concentrated sulfuric acid at a temperature of about 50–60° C. for about 1–4 hours, the amount of sulfur sesquioxide present being about that required to reduce the nitro-group, cooling, neutralizing, filtering, and washing.

The process of reducing nitroanthraquinone to an amino hydroxyanthraquinone with sulfur and oleum is well known in the art. No one, however, has previously applied this reaction to 5-nitroanthraquinone-cyclic-1,4-disulfonimide. No triamino-polyhydroxy anthraquinone has been reported in the literature.

The dye thus prepared is a violet blue and has very strong affinity for cellulose acetate and polyester fibers. Its buildup thereon is much superior to that of the well known commercially available dyes that are essentially tetraminoanthraquinone. The lightfastness and gas fastness of both are similar.

The alkylation of our dyestuffs enhances the desirable properties. The shade is greener than the unalkylated forms. Since the unalkylated form shifts towards a redder shade under tungsten light, it is often desirable to mix it with some of the greener alkylated form. Similar results may be obtained by incomplete alkylation. The alkylation step may be carried out by standard procedures.

Preparation of 5-nitro-anthraquinone-cyclic-1,4-disulfonimide 100 g. of 1,4-diaminoanthraquinone were added to 500 g. of 65% oleum while stirring at 17 to 35° C. Ice bath cooling was used. The batch was heated to 60° C. within 30 minutes and stirred at 60–64° C. for 5 hours, allowed to cool and to stand overnight. The material was then cooled to 10° C. or below and 160.5 g. of 78% sulfuric acid added over a period of 45 minutes. A mixed acid, prepared from 33.8 ml. of 70% nitric acid, 37.9 ml. of 97.2% sulfuric acid, and 3 g. of ice, was added dropwise to the batch at 6–10° C. over a period of one hour. The material was stirred 4 hours at 8–10° C. and stored overnight in a refrigerator. Afterwards 103 g. of water were added in 2½ hours while stirring, the temperature being below 10° C. After stirring 1 hour at 10° C., 20 g. of urea were added. The product was collected by filtration, washed with 60 g. of 85% sulfuric acid, washed neutral to litmus, and dried in a vacuum oven at 60° C. and 1–2 mm. of mercury. 130.5 g. of product were obtained.

Preparation of sulfur sesquioxide (A) 8.6 g. of sulfur were slowly added to 60 g. of 65% oleum in 15 minutes while stirring at 10–15° C. The deep blue mixture was stirred 1 hour longer at 10–15° C.

(B) 11 g. of sulfur were slowly added to 111 g. of 40% oleum at 20° C. or cooler. It was stirred ½ hour and then 167 g. of 100% sulfuric acid were added, the temperature being maintained below 20° C.

EXAMPLE 1

Preparation of mixture of 1,4,5-triamino-2,8-dihydroxyanthraquinone and 1,4,5-triamino-3,8-dihydroxyanthraquinone 31.2 g. of 5-nitroanthraquinone-cyclic-1,4-disulfonimide were added to the above (B) solution and the batch was stirred 2 hours at 25–28° C. It was then heated up to 60° C. This was done gradually over a period of 2 hours and then similarly over a period of 1 hour to a temperature of 90° C. The solution was then a deep violet color. 67 g. of 85% sulfuric acid were added, whereupon the temperature rose to 98–108° C. and the solution turned brown. The batch was heated to 115° C. before cooling to 25–28° C. The remaining sulfur was filtered off and the filtrate run into a mixture of 100 g. sodium sulfate in 300 g. water and 1500 g. ice. The slurry was neutralized with 25% caustic soda to Congo Red and then neutralized to the transition point of litmus by means of 5% sodium carbonate solution. The slurry, after standing overnight, was filtered and washed. The wet pulp, dried at 60–65° C., yielded 21.6 of violet blue dye. Elemental analysis gave results consistent with the formula $$C_{14}H_{18}O_4N_3$$ 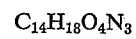

EXAMPLE 2

Methylated mixture of 1,4,5-triamino-2,8-dihydroxyanthraquinone and 1,4,5-triamino-3,8-dihydroxyanthraquinone. Combined reduction and methylation.

150 g. of 100% sulfuric acid were cooled to about 12° C. and then 50 g. of 5-nitroanthraquinone-cyclic-1,4-disulfonimide added in 5 minutes at 12° C. The above (A) sulfur sesquioxide preparation was added at 8° C. and the batch heated gradually in 45 minutes to 55° C. Sulfur dioxide was evolved. The material was maintained at a temperature of 55–60° C. for 2 hours and then cooled. 42 g. of methyl alcohol were added in 30 minutes at 15–30° C. The temperature was gradually raised to 135° C. and stirring continued for 3 hours at 133–135° C. The batch was cooled, drowned, and neutralized by adding 316 g. of 40% sodium hydroxide. The blue solid was filtered off and washed with water until the wash water was sulfate free and neutral to litmus. The yield was 33.90 g.

EXAMPLE 3

Methylated mixture of 1,4,5-triamino-2,8-dihydroxy-anthraquinone and 1,4,5-triamino-3,8-dihydroxyanthraquinone A mixture of 22.8 g. of the product of Example 1, 100 ml. of 96% sulfuric acid, and 97.2 g. of dimethyl sulfate was heated up to 135–140° C. over a period of 1 hour and maintained at that temperature 4 hours. After being cooled to 25–30° C., the batch was drowned in 3½ to 4 liters of ice and water, neutralized with 50% sodium hydroxide solution to Congo paper and then with 29% ammonia to give a strong test on Brilliant Yellow paper. After having stood overnight it was filtered and washed with about 2 liters of water. 20.3 g. of color were recovered.

EXAMPLE 4

Ethylated mixture of 1,4,5-triamino-2,8-dihydroxy-anthraquinone and 1,4,5-trimino-3,8-dihydroxyanthraquinone A mixture of 5.8 g. of the product of Example 1, 25 ml. of 96% sulfuric acid, and 30 g. of diethyl sulfate was heated to 135° C. and stirred 4 hours at 135–140° C. The cooled material was poured into ice and water, most of the acid neutralized with sodium hydroxide, then brought to a pH of 8 with ammonia and allowed to stand overnight. It was neutralized with acetic acid, filtered, and washed with water. 5.77 g. of dyestuff were obtained. The reaction product showed a high degree of ethylation, as indicated by paper chromatography. The shade was greener than the methylated types.

Alkylation was also carried out in alkaline solution as in the following example.

EXAMPLE 5

*Alkaline methylation of the product of Example 1*

A mixture of 5.7 g. of the product of Example 1, 10.7 g. of sodium carbonate (.101 mole), and 50 ml. of N,N-dimethylformamide was stirred 2 hours at room temperature, and then 9.5 ml. of dimethyl sulfate were added dropwise over a period of 1 hour at 28–32° C. The batch was stirred an additional 15 minutes at 32–33° C., drowned in 500–600 ml. water, stirred ½ hour, and allowed to stand overnight. The pH was adjusted to 8. The material was filtered and washed with about 1 liter of water. The solid product amounted to 6.03 g. Paper chromatography showed that the beta hydroxy groups had been completely alkylated.

The product of Example 1 was also alkylated in sulfuric acid solution using either n-propyl alcohol, isopropyl alcohol, benzyl alcohol, or methyl Cellosolve. In addition alkylations were carried out via alkyl halides in acidic and basic media, as illustrated in the following example.

EXAMPLE 6

*Butylation of the product of Example 1*

A mixture of 14 g. (.049 mole) of the product of Example 1, 80 ml. of 96% sulfuric acid, and 110 g. (.8 mole) of n-butyl bromide was heated up to the boiling point of butyl bromide (102° C.). This temperature was maintained while the batch was stirred 4 hours and then lowered to 25–30° C. The charge was drowned in 2 liters of ice and water, neutralized to Congo Red with 50% sodium hydroxide solution, made alkaline to litmus with ammonia, and allowed to stand overnight. The material was then made acid to litmus with acetic acid, filtered, slurried in water, filtered again, and sucked dry. It was dried in an oven at 60–65° C. overnight. 13.2 g. of dried product were recovered. Paper chromatography confirmed that alkylation had taken place.

EXAMPLE 7

*Combined reduction and alkylation*

A solution of sulfur sesquioxide was prepared by adding 43 g. (1.34 mole) of sulfur to 650 g. of 65% oleum at a temperature of 10–14° C. over a period of one hour and then stirring one hour longer at the same temperature range.

250 g. (.614 mole) of 5-nitro-anthraquinonecyclic-1,4-disulfonimide were dissolved in 2500 g. of 100% sulfuric acid. The material was cooled to 3° C. and the above sulfur sesquioxide added. The batch was warmed to 55–60° C. and maintained at that temperature for two hours. 700 g. (21.8 moles) of methyl alcohol were added dropwise over a period of 1½ hours, the temperature being kept below 34° C. The temperature was raised to 135° C. and maintained at that point for about 3 hours. The material was then cooled, poured into ice and water, and neutralized with about 4–4½ lbs. of sodium hydroxide (in the form of a 20% aqueous solution.) The batch was made alkaline to Brilliant Yellow with aqueous ammonia and then neutralized with acetic acid. The product was filtered and washed with about 8 liters of water. The yield amounted to 178 g. of solid dye.

The temperature of alkylation affects the shade of the dye. A reaction temperature of 140° C. or higher produces a greener shade than those given at lower reaction temperatures. It is generally preferred to alkylate in the range 130–140° C. and for one to four hours. The longer the reaction time, the greener the shade of the blue product, since the degree of alkylation increases with reaction time. The unalkylated product shows a strong shift to red shades under tungsten lighting.

The blue dyestuff isolated in Example 1 was recrystallized. Elemental analysis was consistent with the formula $C_{14}H_{11}O_4N_3$; Calculated: $C=59.0\%$, $H=3.87\%$, $N=14.73\%$, $O=22.40\%$. Found: $C=59.08\%$, $H=3.95\%$, $N=14.84\%$, $O=22.13\%$.

The dyestuff could not be eluted from a magnesium carbonate column nor could it be eluted beyond the sodium carbonate buffer zone in a paper chromatogram. This indicates the presence of a beta-hydroxy group according to Hayer, Kolloid Z., 116, 121 (1950); 121, 121–9 (1951). The dyestuff was then alkylated only in the beta-hydroxy position by known methods. See for example U.S. Patent 1,964,971. This alkylated product could then be eluted from a magnesium carbonate column and would pass a sodium carbonate buffer zone in a paper chromatogram, indicating that the alkylated product no longer contained a beta-hydroxy group. The presence of an alpha-hydroxy group is shown by the fact that the beta-alkylated product described above is irreversibly adsorbed on an alumina column [Vankatarman, Proc. Indian Acad. Sci. 32A, 348–51 (1952); Stewart, Faraday Soc. 7, 65 (1949)].

The presence of two isomeric compounds was indicated by a paper chromatogram of the beta-alkylated dyestuff showing two overlapping bands. See, for instance, "Principles and Practices of Chromatography," by L. Zechmeister and L. Cholnoky, chapter 1, New York (1950).

The dyestuff is thus shown to be a mixture of isomers corresponding to 1,4,5-triamino-X,8-dihydroxy anthraquinone, wherein X can be any two of the positions 2,3,6,7.

Classical chemical considerations indicate that the dyestuff is a mixture of 1,4,5-triamino-3,8-dihydroxy anthraquinone and 1,4,5-triamino-2,8-dihydroxyanthraquinone. For example, Karrer (Organic Chemistry, 1938 ed., page 413) indicates the reduction reaction could take place by the following mechanism.

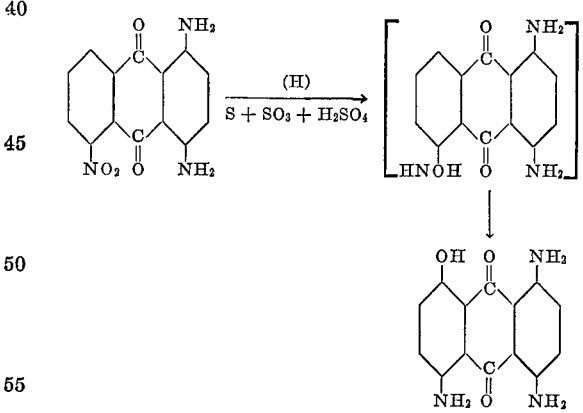

This would account for the alpha-hydroxy group but not for the beta-hydroxy group.

Other tests indicated that the beta-hydroxy groups are in the 2 and 3 positions. For instance when the sulfur sesquioxide reduction treatment of this invention was applied to 2,3-dichloro-5-nitroanthraquinone-cyclic-1,4-disulfonimide, the product obtained did not contain beta-hydroxy. Thus, when the 2 and 3 positions are blocked by chloro-groups, the process does not produce beta-hydroxy substitution.

The dyestuff prepared by the process of Example 1 was processed by paper chromatography to separate the two isomers. To avoid any error that might be caused by the possible formation of artifacts, three separate systems of development were used, as described below.

(1) The sample was applied on a Whatman No. 1 strip of chromatographic paper 1 inch wide from a dioxane solution of the mixed isomers (from Example 1) and air dried 10 minutes. Development by ascending chromatography was then carried out using as developer a mixture of 50 ml. petroleum ether, 40 ml. toluene, 10 ml. methanol, and 1 drop of water. After 72 hours of development the dyestuff had split into two separate blue regions of the same shade and a small amount of a third violet constituent. The relative quantities of the two blue ingredients was of the order of 40–60%.

(2) The paper (another strip of the type used in 1) was wet with toluene before the sample was applied from a dioxane solution of the mixed isomers. The strip was air dried 10 minutes before development by ascending chromatography. The developer used was a mixture of 50 ml. petroleum ether, 40 ml. toluene, 10 ml. methanol and 1 drop of 90% formic acid. Development was carried out for 24 hours. The results were similar to those in 1.

(3) The sample was applied to the paper (another strip of the type used in 1) from a dioxane solution of the mixed isomers and air dried 10 minutes before development by ascending chromatography. The developer was a mixture of 50 ml. petroleum ether, 40 ml. toluene, 9 ml. methanol, and 1 ml. pyridine. Development was carried out for 24 hours. The results checked those in 1 and 2.

Dyeing tests were made comparing the claimed dyestuffs with 1-hydroxy-4,5,8-triaminoanthraquinone. The alkylated products of both were also compared. The 1-hydroxy-4,5,8-triaminoanthraquinone used in these tests was made by the following method.

1-hydroxy-4,5,8-triaminoanthraquinone 27 g. of leuco-1,4,5,8-tetrahydroxyanthraquinone were heated in 250 g. of 24% by weight aqueous ammonia solution with 3 g. of sodium hydrosulfite for 5 hours in an autoclave at 119–120° C. The reaction mixture, after cooling, was filtered and the filter cake washed with water until the wash water was neutral to litmus. The solid material was then dried at 50–55° C. 25.3 g. of crystals were recovered, representing a yield of 95%. This leuco product was oxidized by the following standard method. 25 g. of leuco 1-hydroxy-4,5,8-triaminoanthraquinone produced in the above process was heated to 101° C. over a period of 1½ hours and 0.25 ml. piperidine was added over a 5-minute period. The batch was then heated to 150° C. over a period of 2½ hours and held at this temperature for 3 hours more. The cooled material was filtered and the filter cake washed with about 450 ml. of petroleum ether and dried at 50–55° C. The yield was 96.5%.

A portion of this product was alkylated by heating up to 133–136° C. over a period of 1 hour 11.4 g. of the 1-hydroxy-4,5,8-triaminoanthraquinone prepared by the above process in 50 ml. of 96% sulfuric acid and 48.6 g. of dimethyl sulfate and then heating at 134–136° C. for 4 hours. When cool the batch was drowned in about 1½ liters of ice and water and neutralized to litmus with 50% sodium hydroxide solution. The solid material was filtered off and washed until free from sulfate ion and neutral to litmus. It was dried at 50–55° C.

The dyeings were made on cellulose acetate cloth by a conventional procedure. The dyestuff, dispersed in 2 cc. of a 5% sodium lauryl sulfate solution, was diluted up to 300 cc. with warm water. A 10-gram piece of the cloth was entered, the bath being stirred constantly. The temperature was then raised to 83–85° C. and maintained there for 50 minutes. The cloth was removed, rinsed, and dried. A series of 0.5%, 2%, 4%, and 6% dyeings was made on each of the four dyestuffs, the "%" representing percent by weight of dyestuff based on the weight of cloth. The densities of the dyeings were measured by conventional spectrophotometric procedures and are represented in the table by "Y" values. The density is inversely proportional to the "Y" values.

"Y" VALUES

| Dye | Percent dye based of weight of cloth | | | |
|---|---|---|---|---|
| | 0.5 | 2.0 | 4.0 | 6.0 |
| (1) The dye of Example 3 | 14.0 | 4.6 | 2.9 | 2.5 |
| (2) The dye of Example 3 | 14.9 | 5.6 | 3.1 | 2.7 |
| (3) The dye of Example 1 | 14.3 | 6.4 | 4.4 | 3.8 |
| (4) Methylated 1-hydroxy-4,5,8-triaminoanthraquinone as above | 18.6 | 9.0 | 6.1 | 5.0 |
| (5) 1-hydroxy-4,5,8-triaminoanthraquinone as above | 15.1 | 8.3 | 6.6 | 6.0 |

It will be seen from the table that the dyes of this invention show buildup much superior to that of the 1-hydroxy-4,5,8-triaminoanthraquinone series. (1) for example has (except for the 0.5% dyeings) up to twice the buildup of (4).

When the dyestuff of Example 2 was used commercially for printing "Arnel" (cellulose triacetate) textile fabrics, it was discovered that it did not "spew" on the cloth, in contrast with the currently popular competitive blue, which is tetraminoanthraquinone. This is an unpredictable phenomenon, also a commercially valuable one. "Spewing" is a type of bleeding that occurs in the "setting" or steaming step in textile printing and is manifested by sharp edges of dyed pattern bleeding out to form irregular outlines.

What is claimed is:
1. A blue dyestuff which is a mixture of 1,4,5-triamino-2,8-dihydroxyanthraquinone and 1,4,5-triamino-3,8-dihydroxyanthraquinone, the two isomers having a molar ratio to one another of about 3:2.

2. A process of making a mixture of 1,4,5-triamino-2,8-dihydroxy-anthraquinone and 1,4,5-triamino-3,8-dihydroxy-anthraquinone by reducing and hydroxylating 5-nitro-anthraquinone-cyclic-1,4- disulfonimide by treatment with sulfur sesquioxide in concentrated sulfuric acid at a temperature of about 50–60° C. for about 1–4 hours, the amount of sulfur sesquioxide present being about that required to reduce the nitro-group, the two isomers being present in the ratio of about 3:2.

3. A combined process of reducing, hydroxylating, and alkylating 5-nitroanthraquinone-cyclic-1,4-disulfonimide to form alkyl derivatives of a mixture of 1,4,5-triamino-2,8-dihydroxyanthraquinone and 1,4,5-triamino-3,8-dihydroxyanthraquinone, the two isomers being present in said mixture in the ratio of about 3:2 by treatment with sulfur sesquioxide in concentrated sulfuric acid at a temperature of about 50–60° C. for about 1–4 hours, the amount of sulfur sesquioxide present being about that required to reduce the nitro-group, cooling to about room temperature, adding an alkyl alcohol having 1–4 carbon atoms and heating at about 135–140° C. for about 1–4 hours.

References Cited

UNITED STATES PATENTS

| | | | |
|---|---|---|---|
| 1,976,167 | 10/1934 | Grossmann | 260—379 |
| 2,094,311 | 9/1937 | Utzinger et al. | 260—377 |
| 2,392,663 | 1/1946 | Grossmann | 260—377 |

OTHER REFERENCES

Barnett, "Anthracene and Anthraquinone" (1921), p. 225.

Houben, "Das Anthracen and Die Anthraquinone" (1929), pp. 410 and 417.

LORRAINE A. WEINBERGER, *Primary Examiner.*

LEON ZITVER, *Examiner.*

RICHARD JACKSON, *Assistant Examiner.*